April 13, 1965 J. R. ELLETT 3,177,513
PIPELINE CLEANER INSERTER VALVE
Filed May 14, 1962
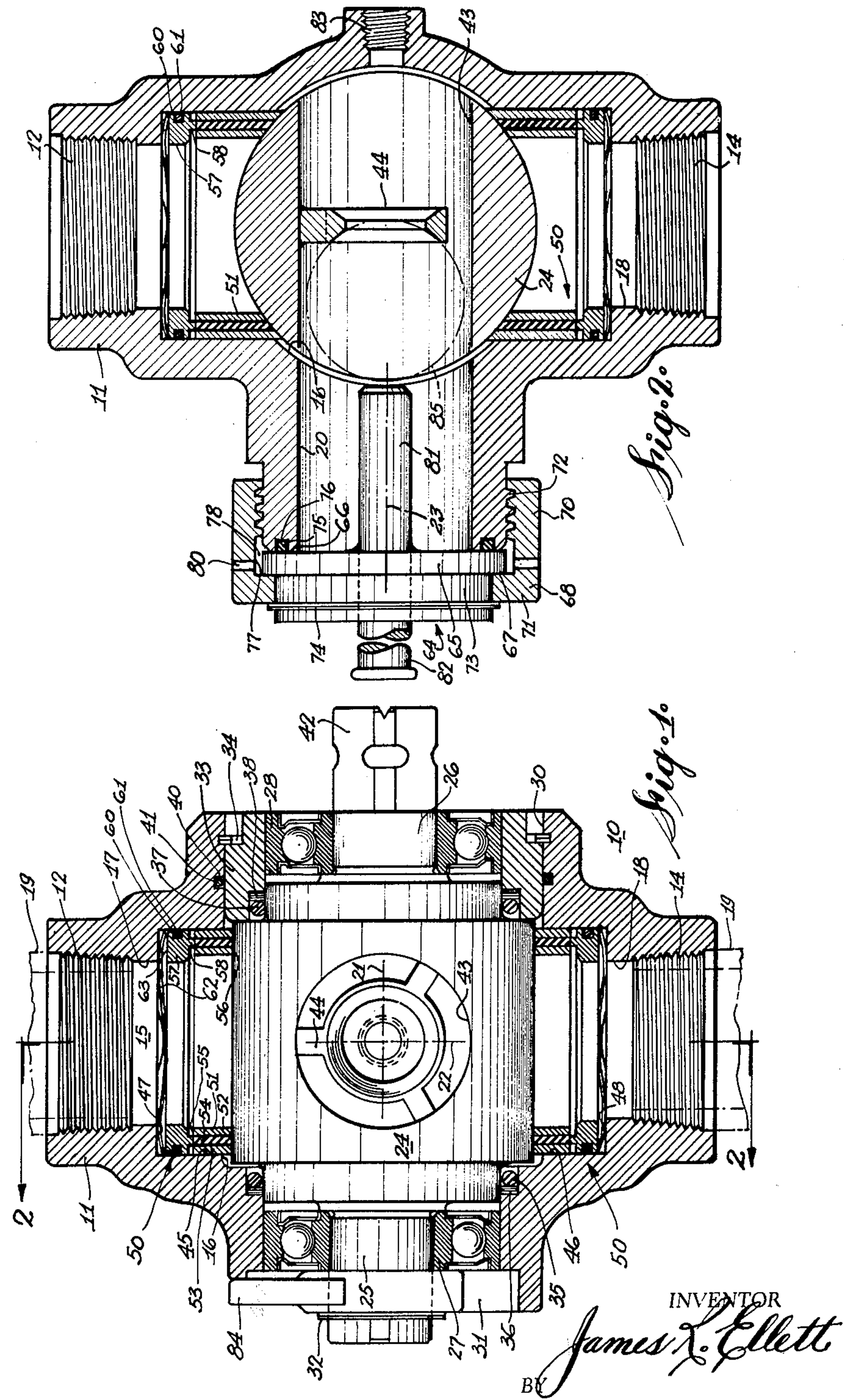

United States Patent Office 3,177,513
Patented Apr. 13, 1965

3,177,513

PIPELINE CLEANER INSERTER VALVE

James R. Ellett, Edmonton, Alberta, Canada, assignor to Barber Machinery Limited, South Edmonton, Alberta, Canada Filed May 14, 1962, Ser. No. 194,229
5 Claims. (Cl. 15—104.06)

This invention relates to a valve for use in a pipeline for injecting into and removing from the pipeline a pipeline cleaning device or "pig."

In pipelines carrying various liquids under pressure from one location to another there is a tendency for the pipelines to become fouled or clogged because of deposits forming on the inside of the pipe. For example, in pipelines conveying mineral oils from one place to another, a coating of paraffin wax tends to deposit on the inside of the pipeline. The characteristics of the liquid being conveyed will determine to a large extent the type and rate of fouling of the pipeline. Such fouling slowly decreases the effective cross-sectional area of the pipeline and thereby restricts the flow of the liquid through the pipeline.

It is necessary that a pipeline be cleaned or scraped periodically to maintain efficient flow through the pipeline. The pipeline is normally cleaned by injecting or inserting a "pig" or "go devil" into the pipeline. Various kinds of pigs have been devised in the past. A pig may be made of various known materials and may be, for example, in the form of a sphere or ball, in the form of a sphere having regular or irregular protuberances, in a cylindrical form, or in any of the other well known forms, each being of an outer diameter a bit less than the inner diameter of the pipeline. Once a pig is injected into the pipeline it is forced through the pipeline by the pressure of the liquid behind it. The passage of the pig cleans the pipeline.

Several ways have been contrived to inject a pig into a pipeline and subsequently to remove it from the pipeline. One such way utilizes a pair of valves in the main pipeline or flow line which are shut when a pig is to be placed in the pipeline. When the valves are shut a portion of the pipeline between is isolated and the liquid in this isolated portion is drained. An injection valve in the isolated portion is opened, the pig is injected into the line through this open valve, and the injection valve is closed. The pair of isolating valves are then opened to restore normal flow. It will be seen that there are several disadvantages to this manner of injecting a pig into a pipeline. The process is not only time consuming but it interrupts normal flow for considerable time and results in the loss of a quantity of liquid.

Another way of injecting a pig utilizes a branch pipe joining the main pipeline. An isolating valve at the junction isolates the branch pipe while a pig is inserted in the branch pipe through a pig inserting valve. Once the pig is in the branch pipe and the pig inserting valve closed, the isolating valve is opened and a pushing mechanism operated to push the pig into the main pipeline or flow line. A deflecting trap or grating farther along the pipeline may deflect the pig into another branch pipe for removal. The flow is uninterrupted when this method of injecting a pig is used and the method is more convenient. However, it requires branch pipes and isolating valves.

In order to overcome some of the aforementioned disadvantages, attempts have been made in the past to provide pipeline cleaner valves, that is valves for injecting a pig into a pipeline and for trapping and removing a pig from a pipeline, which can be coupled directly into the flow line or main pipeline. These prior valves have not been entirely satisfactory. Some of the prior valves operate to inject a pig into a pipeline but not to remove it. Many of the prior valves cannot be used at high pressures because adequate sealing cannot be achieved between the parts in contact with high pipeline pressures and the parts exposed to atmospheric pressures during insertion or removal of a pig. Prior valves are frequently difficult to operate under high pressures. Further, these prior valves have no safety feature to ensure that the pig insertion portion is at atmospheric pressure before the closure member is removed for insertion of the pig.

The present invention is for an improved pipeline cleaner valve having novel structure and being of the last mentioned kind for coupling directly into a pipeline.

It is therefore an object of this invention to provide an improved pipeline cleaner valve of simple design and of novel structure for coupling directly into a pipeline.

It is a further object of the invention to provide a pipeline cleaner valve of novel structure having a rotary part which in a first position positively shuts off fluid flow in the pipeline permitting insertion of a pig, and in a second position quickly injects the pig into the pipeline and restores flow.

It is another object of the invention to provide a closure cap for the pig insertion opening of a pipeline cleaner valve including means to ensure that the pig insertion opening of the valve is at atmospheric pressure before the closure cap is completely removed.

It is yet another object of this invention to provide an improved sealing device for effecting a seal between the fluid carrying passages of a pipeline cleaner valve and a rotary cylindrical plug member used for injecting a pipeline cleaning pig into a pipeline in which the valve is mounted.

Other objects and advantages of this invention will be apparent from the following description taken in conjunction with the accompanying drawings in which FIGURE 1 is a cross-sectional view of a pipeline cleaner valve in accordance with an embodiment of the invention, and FIGURE 2 is a cross-sectional view of a pipeline cleaner valve taken along line 2—2 of FIGURE 1.

Briefly the invention is for a pipeline cleaner valve comprising a valve casing having a pair of oppositely disposed fittings for coupling to sections of a pipeline, said casing being provided with a cylindrical chamber and a first passage intersecting said chamber, said first passage extending from one of said fittings to the other and having a first axis, said cylindrical chamber having a second axis at right angles to said first axis, said casing being further provided with a second passage opening into said cylindrical chamber and having a third axis intersecting said second axis at right angles, cover means removably fitted to the outer end of said second passage, a cylindrical valve plug having axial bearing projections at each end and a transverse bore extending diametrically through said plug, bearings in said casing engaging said bearing projections and supporting said valve plug for rotary movement within said chamber to a first position registering said transverse bore at both ends with said first passage and to a second position registering said transverse bore at one end with said second passage, and sealing means in said first passage making sealing contact around said first passage adjacent the intersection of said first passage with said chamber and making sealing contact with the adjacent portion of said valve plug.

Referring now to the drawings, the number 10 designates generally the pipeline cleaner valve of the embodiment shown. The valve 10 comprises a valve casing 11 having a pair of oppositely disposed fittings 12 and 14 to couple the valve to sections of a pipeline 19 indicated in phantom on the drawings. The fittings 12 and 14 are shown as internally threaded fittings, but it will be apparent that other fittings would also be satisfactory.

The casing 11 has a fluid flow passage 15 extending from fitting 12 to fitting 14 and intersecting a cylindrical chamber 16. The chamber 16 divides passage 15 into two aligned parts which are referred to as passages 17 and 18 for ease of description. The casing 11 has a further passage 20 opening into chamber 16.

To locate the relative positions of the cylindrical chamber 16 and passages 17, 18 and 20, the axis of chamber 16 is designated 21, the common axis of passages 17 and 18 is designated 22, and the axis of passage 20 is designated 23. The cylindrical chamber 16 and passages 17 and 18 are so arranged that their axes 21 and 22 are at right angles. Passage 20 is positioned so that its axis 23 is at right angles to axis 21, and preferably axis 23 is at right angles to both axes 21 and 22.

A cylindrical valve plug 24, sized to fit within chamber 16 with sufficient clearance to permit easy rotation, having axial bearing projections 25 and 26, is rotatably supported by bearings 27 and 28 in casing 11. The plug 24 may be assembled through opening 30 in one side of casing 11.

An end ring 31 is keyed or otherwise locked to the end part of bearing projection 25 and retained by a retaining ring 32 secured to bearing projection 25. Bearing 28 is mounted in a bearing ring 33 which is mounted in opening 30 of valve casing 11 and secured by a retaining ring 34 in a groove in casing 11 in opening 30. Bearing projection 26 extends externally of the casing 11 as a shaft 42 to receive a handle or to accommodate a wrench (not shown) for rotating plug 24 within cylindrical chamber 16.

An O ring seal 35 and a back-up washer 36 effect a fluid pressure seal between valve plug 24 and casing 11 at the side of valve plug 24 adjacent projection 25. Similarly, an O ring seal 37 and a back-up washer 38 effect a pressure seal between valve plug 24 and a bearing ring 33 at the other side of valve plug 24 adjacent bearing projection 26. A groove 40 in casing 11 around the inside of opening 30 contains an O ring seal 41 which seals bearing ring 33 and casing 11. It will, of course, be apparent that other suitable sealing means could be used instead.

The cylindrical valve plug 24 is provided with a transverse bore 43 extending diametrically through the plug 24. The bore 43 is located in plug 24 so that rotary movement of plug 24 to one position aligns the bore axis with axis 22 and the bore 43 registers with passages 17 and 18, and in another position the bore axis aligns with axis 23 and one end of bore 43 registers with passage 20.

If the valve is to be used for catching or trapping pigs, then the bore 43 may have a ring grating 44 or "frog" across the bore. The ring grating 44 is supported from the sides of bore 43 and should impede the flow of fluids through the bore as little as possible.

In passages 17 and 18 adjacent the intersection of the passages with cylindrical chamber 16 are recesses 45 and 46 forming shoulders 47 and 48 respectively. Each of the recesses 45 and 46 holds a sealing assembly 50. The sealing assembly 50 serves to effect a pressure seal between passage 17 and the adjacent surface of valve plug 24, and between passage 18 and the adjacent surface of valve plug 24. The sealing assembly 50 is the same in both passages 17 and 18 and the detail designation numbers are shown only with respect to passage 17 for convenience.

Sealing assembly 50 comprises a sealing element 51 having inner and outer metallic rings 52 and 53 respectively with a center sealing ring 54 of resilient material bonded therebetween. The sealing element 51 presents a substantially flat annular end surface 55 on one end and a formed end 56 on the other end. End 56 is formed to fit the adjacent curved surface of cylindrical valve plug 24. The center sealing ring 54, at the formed end 56, protrudes or projects beyond inner and outer rings 52 and 53 so that the resilient material contacts the valve plug first.

Adjacent end surface 55 of sealing element 51 is an annular piston 57 having an annular tongue 58 on the side of the piston facing surface 55. The width of tongue 58 is just less than the thickness of center sealing ring 54, and the tongue 58 is positioned on piston 57 so that it is between boundaries defined by the planes of adjacent walls of rings 52 and 53. In other words, if the piston 57 is urged towards surface 55 of sealing element 51, the tongue 58 will cause a sealing action between them and will tend to urge the center material 54 in a direction such that it protrudes farther.

Piston 57 has a peripheral groove 60 in which there is an O ring seal 61. This creates a sealing action between piston 57 and the wall of recess 45. A spring washer 62 is in a passageway 63 between shoulder 47 and piston 57 urging piston 57 towards valve plug 24. Any fluid in passage 17 is thus confined by the sealing assembly 50.

The action of washer 62 urging piston 57 in a direction towards the valve plug 24 is supplemented by fluid pressure in passage 17. The fluid entering a fluid receiving passageway 63 exerts a pressure on the surface of piston 57 forming one side of passageway 63. This pressure acts on the entire area of the piston to the outer periphery of the seal 61. The pressure acts also on the opposite side of piston 57 but not over the entire surface because tongue 58 and resilient ring 54 seals the fluid pressure and contain it within passage 17. There is therefore pressure differential across tongue 58 and a mean effective area on which the pressure acts to move piston 57 in the opposite direction away from the valve plug 24. Because of the difference in effective areas of the piston, fluid pressure in chamber 17 creates a net force towards valve plug 24. If the pressure increases the net force increases and this, in turn, causes more sealing force and a stronger seal.

As the protruding end of center sealing ring 54 wears away because of abrading action between the surfaces or between the surfaces and small sand or dirt particles, the resilient material of ring 54 has sufficient resilience that the tongue 58 tends to press the resilient material outwards to replace the abraded material in a sort of feeding action. That is, the ring 54 is bonded to rings 52 and 53, but because of the resilience of ring 54, tongue 58 tends to depress the central part of ring 54 moving it outwards at the other side to replace abraded material. This increases the useful life of the sealing element 51.

The passage 20 is closed at its outermost end by a closure cap 64, which comprises a closure disc 65 having a sealing surface portion 66 and an opposite outer surface 67, and a ring nut 68 having a shank 70 and a head 71. The shank 70 is threaded interiorly to engage thread 72 on the outside of casing 11, and the head part 71 engages the outer surface 67. A cylindrical extension 73 on the outward side of closure disc 65 projects through an opening in head part 71 loosely engaging the walls of the opening in head part 71 at its smallest or innermost diameter to keep the disc 65 centrally positioned within shank 70. A retaining ring 74 is mounted in the extension 73 to engage the outer surface of the head part 71. The closure disc 65 is thus fastened to the ring nut 68 to permit relative rotary movement therebetween. An O ring seal 75 is set in an outwardly facing groove 76 around the outer end of passage 20. As the ring nut 68 is turned to tighten the closure cap, the closure disc is forced inwards so that the sealing surface portion 66 presses against O ring seal 75 closing passage 20.

An inner surface 77 of shank 70 and the peripheral edge of closure disc 65 define a peripheral passageway 78. The passageway 78 is adjacent to and communicates with the outer periphery of the seal effected by sealing surface portion 66 and seal member 75. At least one bleed aperture 80 extends through shank 70 communicating with passageway 78.

A pig insertion lever 81 is fastened to closure disc 65 and extends through passage 20 terminating at the intersection of passage 20 with cylindrical chamber 16. If desired, the lever 81 may extend outwardly of closure disc 65 to form a handle 82.

When the pipeline cleaner valve 10 is connected between two sections 19 of a pipeline, and the cylindrical plug 24 is in a fluid passing position, fluid under pressure passes from say fitting 12 through passage 17 and bore 43 which is aligned with and registering with passages 17 and 18, through passage 18, and out via fitting 14. Inasmuch as the valve 10 shown in the drawings is symmetrical, the fluid could, of course, go in the reverse direction. The fluid passing through the valve is prevented from flowing out of this aforementioned path by the sealing assemblies 50.

If the valve is operated to a pig-inserting position by rotary movement of shaft 42, the flow of fluid through the valve is stopped. The valve 10 is shown in this position in the drawings. Before the closure cap 64 is removed, it is desirable to have the pressure in bore 43 and passage 20 at atmospheric pressure. A bleed valve (not shown) may be mounted in the threaded opening 83 which is provided. If a bleed valve is used it is opened at this time until the pressure inside passage 20, bore 43 is reduced to atmospheric pressure, then the bleed valve is closed and the closure cap 64 removed. The closure cap 64 includes a safety feature which ensures that the internal pressure within passage 20, bore 43 is atmospheric before the cap 64 is entirely removed. If a bleed valve is not used, or if an operator forgets to operate the bleed valve, the safety feature will come into operation.

As the ring nut 68 is rotated to unscrew closure cap 64, the sealing surface portion 66 of closure disc 65 is raised from seal 75. This forms a pathway from passage 20, between the seal 75 and sealing portion 66, through passageway 78 and aperture 80. Thus, the pressure within the pig-insertion passage 20 is reduced to atmospheric as ring nut 68 is first loosened.

When the closure cap 64 is removed the pig-insertion and removal passage 20 is exposed and a pig may be inserted. The closure cap 64 is replaced and ring nut 68 tightened sealing passage 20 and the pig is pushed into bore 43 by the pig-insertion lever 81. One type of pig is indicated in position in FIGURE 2 in phantom as pig 85. Shaft 42 is then rotated to align bore 43 with passages 17 and 18 to inject the pig 85 into the pipeline and restore fluid flow.

The valve 10, if equipped with a ring grating or frog 44, may be used to trap and remove a pig from a pipeline. The removal procedure is the reverse of that for inserting the pig.

The end ring 31 may have a stop lever 84 projecting from it to engage suitable stops on casing 11. The stops may be positioned so that they engage the stop lever when the valve plug 24 is in its fully open and when it is in the pig insertion or pig removal position. The stops may be used to ensure that, for the removal of a pig, the pig is on the side of frog or ring grating 44 that is next to passage 20. Alternately an indicated arm on end ring 31 with suitable indicia on the casing may be used.

It will be apparent that the bore 43 should be of a substantially greater diameter than the diameter of the pig. Thus, when a pig is trapped in bore 43 by ring grating 44, the flow of fluid through the valve may still take place. An inlet pipe section coupled to inlet fitting 12 in the drawings, and an outlet pipe section coupled inside outlet fitting 12, would have a diameter smaller than the diameter of passages 17 and 18. It is convenient to have the inner diameter of passages 17 and 18 substantially the same as bore 43 where the bore registers with the passages. As shown, the inner diameter of sealing element 51 (which may be considered the inner diameter of passages 17 and 18 in the vicinity of the junction of the passages with bore 43) is substantially the same diameter as bore 43. In other words, the valve 10 is constructed so that the fluid passage through it increases in size from the pipeline size at the inlet smoothly or in one or more discrete steps to the bore size and then decreases in size once more to the outlet. The passage 20 is conveniently made the same diameter as that of bore 43.

The design of valve 10 is such that lubrication is not required at periodic intervals. The valve seals positively and turns easily without periodic lubrication.

It will be seen that the valve of this invention is of straightforward design and construction. It requires little maintenance and has a relatively long life. It is equipped with a safety feature on the closure means for the pig-inserting opening to prevent the closure being removed when high pressures are present in the pig-inserting passages. The valve is easily turned and seals positively.

I claim:

1. A pipeline cleaner valve comprising a valve casing having a pair of oppositely disposed fittings for coupling to sections of a pipeline, said casing being provided with a cylindrical chamber having a first axis extending axially within the curved wall of said chamber, first and second aligned fluid passages each extending from one of said fittings and opening into said chamber on opposite sides thereof and having a common second axis intersecting said first axis at right angles, and a third passage opening into said chamber for admission and removal of a pipeline cleaning pig, said third passage having a third axis intersecting said first and second axes at right angles, an annular sealing ring mounted in said casing encircling the outer end of said third passage, a closure disc having a sealing surface portion engaging said sealing ring to close said third passage, a ring nut threadedly engaging said casing and bearing against said closure disc to press said sealing surface portion of said closure disc against said sealing ring, the edge of said closure disc and a portion of the inner surface of said ring nut defining a peripheral passageway adjacent said closure disc sealing surface portion engaging said sealing ring, said ring nut having at least one bleed aperture opening externally and communicating with said passageway, bearings mounted in said casing at opposite ends of said cylindrical chamber and arranged about said first axis, a cylindrical valve plug disposed within said cylindrical chamber and having axial bearing projections at each end engaging said bearings and supporting said valve plug in axial alignment within said chamber for rotary movement about said first axis, said cylindrical valve plug being provided with a transverse bore extending diametrically through said plug and having a fourth axis lying in a plane defined by said second and third axes, at least one of said bearing projections extending externally of said casing for rotating said valve plug to a first position aligning said fourth axis with said second axis and registering said bore with said first and second passages to provide a fluid path through said valve, and to a second position aligning said fourth axis with said third axis and registering said bore with said third passage, and sealing means at the periphery of said first and second passages adjacent said chamber making sealing contact with said first and second passages respectively and projecting into said chamber and making sealing contact with said valve plug.

2. A pipeline cleaner valve as defined in claim 1 further including a pig insertion lever fastened to said closure disc and extending through said third passage terminating at the intersection of said third passage with said chamber.

3. A pipeline cleaner valve as defined in claim 1 further including retaining means on said closure disc mounting said ring nut to said closure disc for relative rotary movement therebetween and restricting longitudinal and transverse relative movement therebetween.

4. A closure cap for a pig insertion pipeline cleaner valve having a valve casing provided with a pig insertion opening having a central axis, an outwardly facing sealing ring of resilient material mounted in said casing around said opening and a threaded portion on said casing extending parallel to said axis, comprising a closure disc having an inwardly facing sealing surface portion to engage said sealing ring and effect a sealing closure of said pig insertion opening and an outwardly facing surface, a ring nut having a cylindrical shank threaded interiorly to engage the threaded portion of said casing and a head part projecting a predetermined distance inwardly of said shank to engage at least part of said outwardly facing surface of said closure disc, and retaining means on said closure disc engaging said projecting head of said ring nut to retain said closure disc centrally within said ring nut and permit relative rotary movement between said nut and said disc, the edge of said closure disc and part of the inner surface of said shank defining a peripheral passageway adjacent to and communicating with said inwardly facing sealing portion of said closure disc, said ring nut having at least one bleed aperture in the shank thereof opening externally and communicating with said passageway.

5. A closure cap as defined in claim 4 in which said retaining means comprises a cylindrical extension on the outwardly facing surface of said closure disc of lesser diameter than said closure disc loosely engaging said head part at its smallest diameter, and a retaining ring mounted in said cylindrical extension retaining said head part between said retaining ring and said outwardly facing surface of said closure disc.

References Cited by the Examiner

UNITED STATES PATENTS

| | | | |
|---|---|---|---|
| 2,466,098 | 4/49 | Grebmeier | 251—174 |
| 2,630,291 | 3/53 | Gifford et al. | 220—44 XR |
| 2,786,219 | 3/57 | Meyer. | |
| 2,866,213 | 12/58 | McArthur. | |
| 2,882,009 | 4/59 | Bryant | 251—172 |
| 2,889,069 | 6/59 | Von Fuchs | 220—39 |
| 2,893,028 | 7/59 | Scaramucci. | |
| 2,977,616 | 4/61 | Willis. | |
| 3,013,769 | 12/61 | Volpin | 251—174 |
| 3,036,590 | 5/62 | Knox | 251—174 |
| 3,037,738 | 6/62 | Jackson et al. | 251—172 |
| 3,063,079 | 11/62 | Bergman. | |
| 3,063,080 | 11/62 | Bergman. | |
| 3,067,977 | 12/62 | Anderson | 251—172 |
| 3,068,887 | 12/62 | Grove | 251—172 X |
| 3,070,254 | 12/62 | Carse et al. | 220—30 |

FOREIGN PATENTS

| | | |
|---|---|---|
| 309,344 | 4/29 | Great Britain. |

CHARLES A. WILLMUTH, *Primary Examiner.*